United States Patent
Wildsmith et al.

(10) Patent No.: US 10,377,096 B2
(45) Date of Patent: Aug. 13, 2019

(54) CONTOUR FORM CONTROL

(71) Applicant: Johnson & Johnson Vision Care, Inc., Jacksonville, FL (US)

(72) Inventors: Christopher Wildsmith, Jacksonville, FL (US); Michael Widman, Jacksonville, FL (US); P. Mark Powell, Jacksonville, FL (US)

(73) Assignee: Johnson & Johnson Vision Care Inc, Jacksonville, FL (US)

( * ) Notice: Subject to any disclaimer, the term of this patent is extended or adjusted under 35 U.S.C. 154(b) by 0 days.

(21) Appl. No.: 15/693,424

(22) Filed: Aug. 31, 2017

(65) Prior Publication Data

US 2018/0126678 A1    May 10, 2018

Related U.S. Application Data

(63) Continuation of application No. 13/854,877, filed on Apr. 1, 2013, now abandoned.

(60) Provisional application No. 61/618,073, filed on Mar. 30, 2012.

(51) Int. Cl.
*B29C 35/08* (2006.01)
*B29D 11/00* (2006.01)

(52) U.S. Cl.
CPC .... *B29D 11/00951* (2013.01); *B29C 35/0894* (2013.01); *B29C 2035/0827* (2013.01); *B29C 2035/0833* (2013.01)

(58) Field of Classification Search
None
See application file for complete search history.

(56) References Cited

U.S. PATENT DOCUMENTS

| | | |
|---|---|---|
| 5,458,771 A | 10/1995 | Todd |
| 6,566,627 B2 | 5/2003 | Brandinger et al. |
| 8,317,505 B2 | 11/2012 | Widman et al. |
| 8,318,055 B2 | 11/2012 | Widman et al. |
| 2002/0049511 A1 | 4/2002 | Brandinger et al. |
| 2003/0017794 A1 | 1/2003 | Kozakai et al. |
| 2007/0195311 A1 | 8/2007 | Morgan et al. |
| 2009/0053351 A1 | 2/2009 | Widman et al. |
| 2009/0250828 A1 | 10/2009 | Rosen et al. |
| 2009/0303465 A1 | 12/2009 | Clements et al. |
| 2013/0123988 A1 | 5/2013 | Jariwala et al. |

FOREIGN PATENT DOCUMENTS

| | | |
|---|---|---|
| EP | 0575885 B1 | 12/1993 |
| EP | 0264255 A1 | 6/1995 |
| JP | 11348142 A | 12/1999 |
| JP | 2007511796 | 5/2007 |
| WO | WO 2000048035 A1 | 8/2000 |
| WO | WO 2004015481 A1 | 2/2004 |
| WO | WO 2004046792 A1 | 6/2004 |
| WO | WO 2009025848 A2 | 2/2009 |
| WO | WO 2009025848 A3 | 5/2009 |
| WO | WO 2011000846 | 1/2011 |

*Primary Examiner* — Sean Shechtman

(57) ABSTRACT

This invention describes methods and apparatus for implementing a Convergence Process to Converge a Lens Design wherein a previous DMD Show may be modified for a subsequent Iteration. In preferred embodiments, an Iterative Loop may be initiated during a Convergence Process wherein one or more of various: techniques, modalities, and thickness correction methods may be implemented.

15 Claims, 13 Drawing Sheets

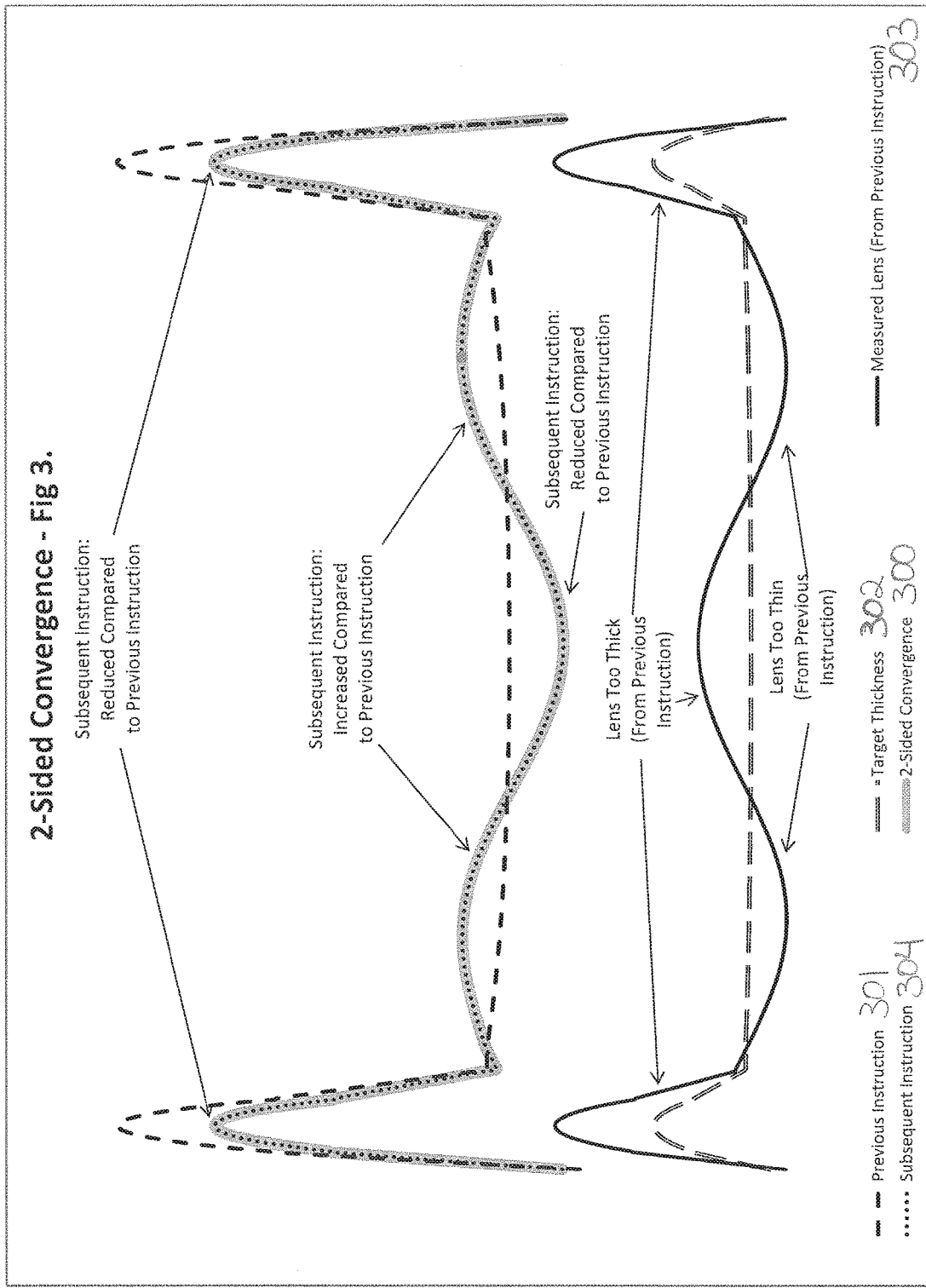

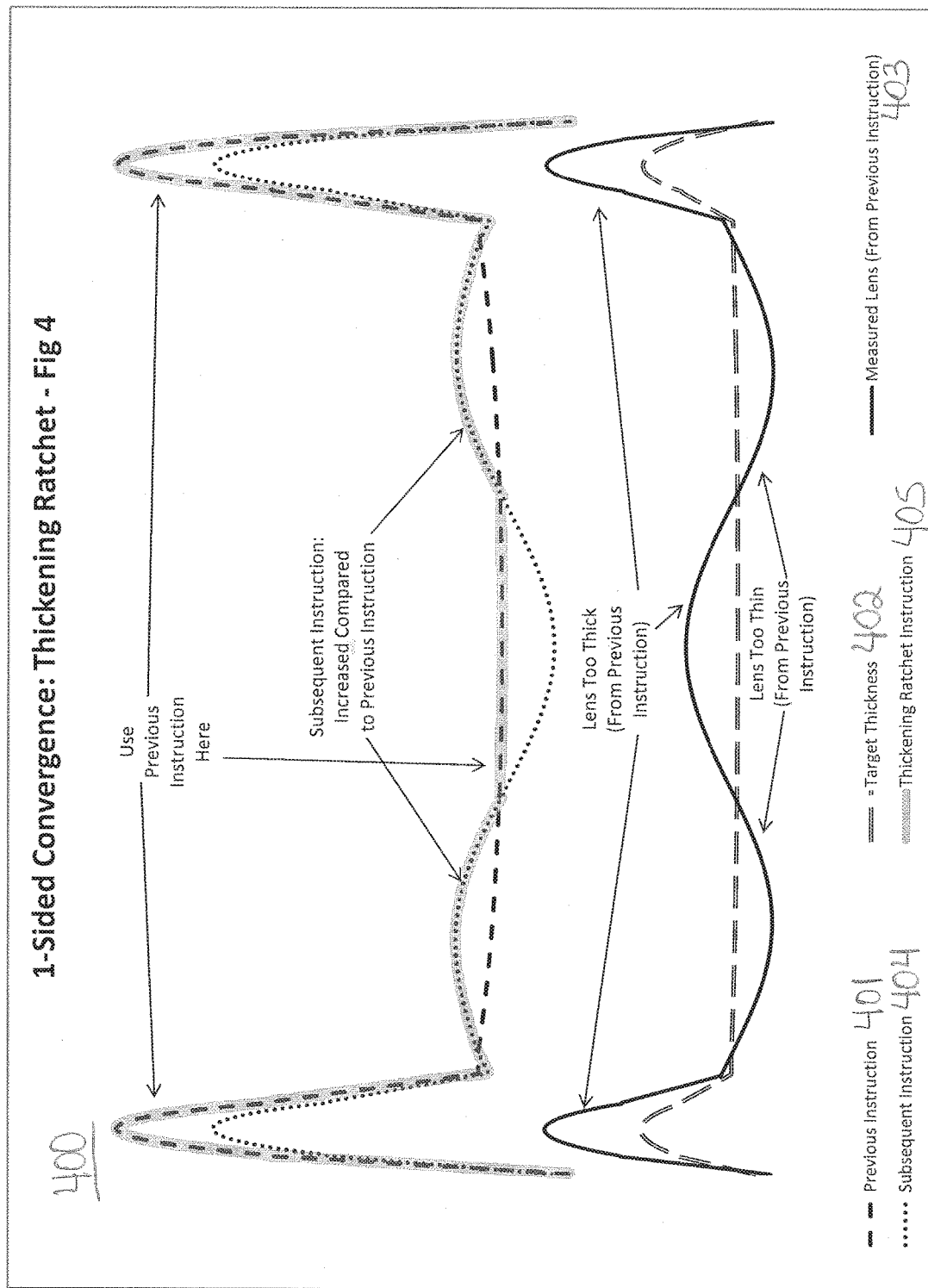

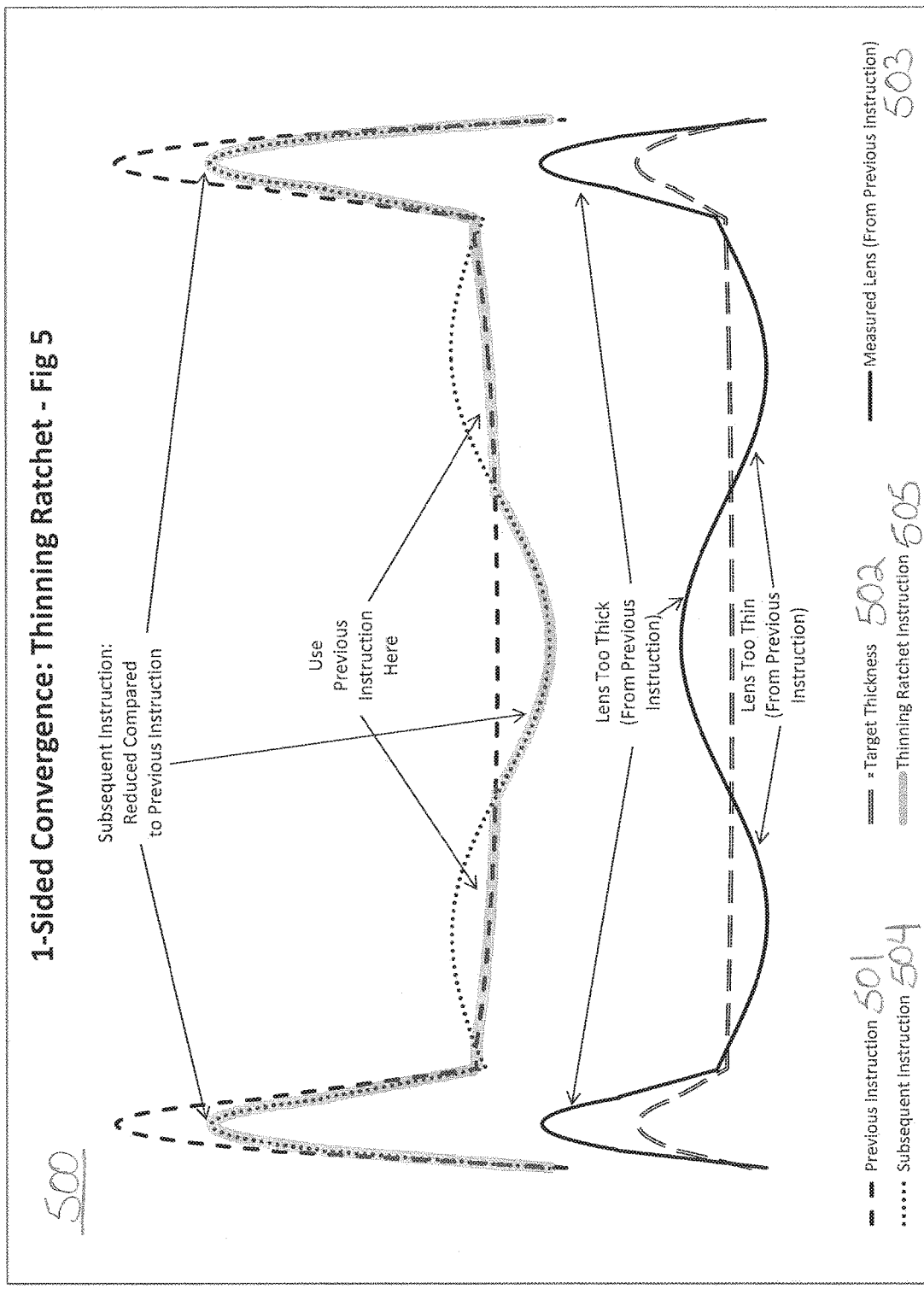

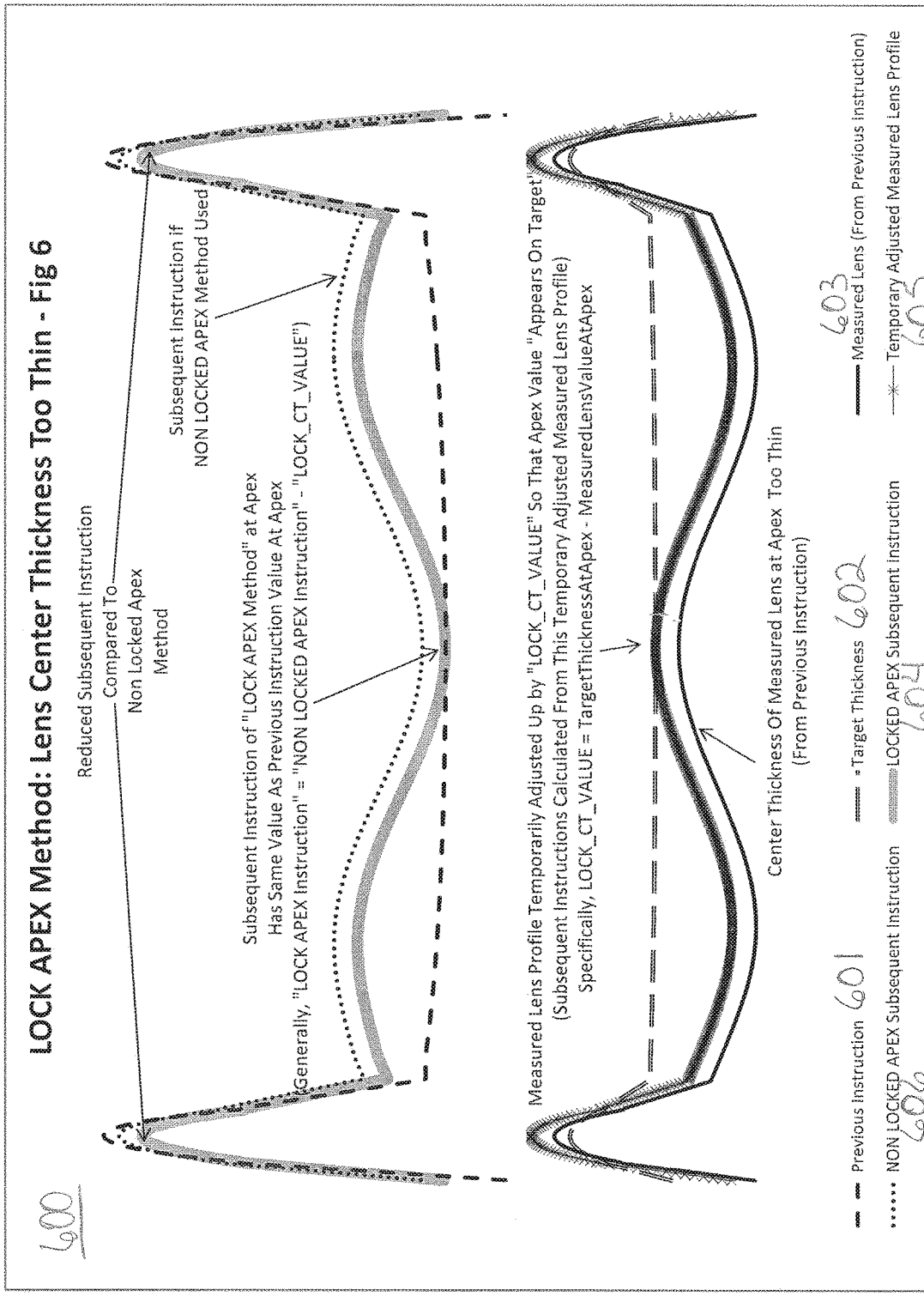

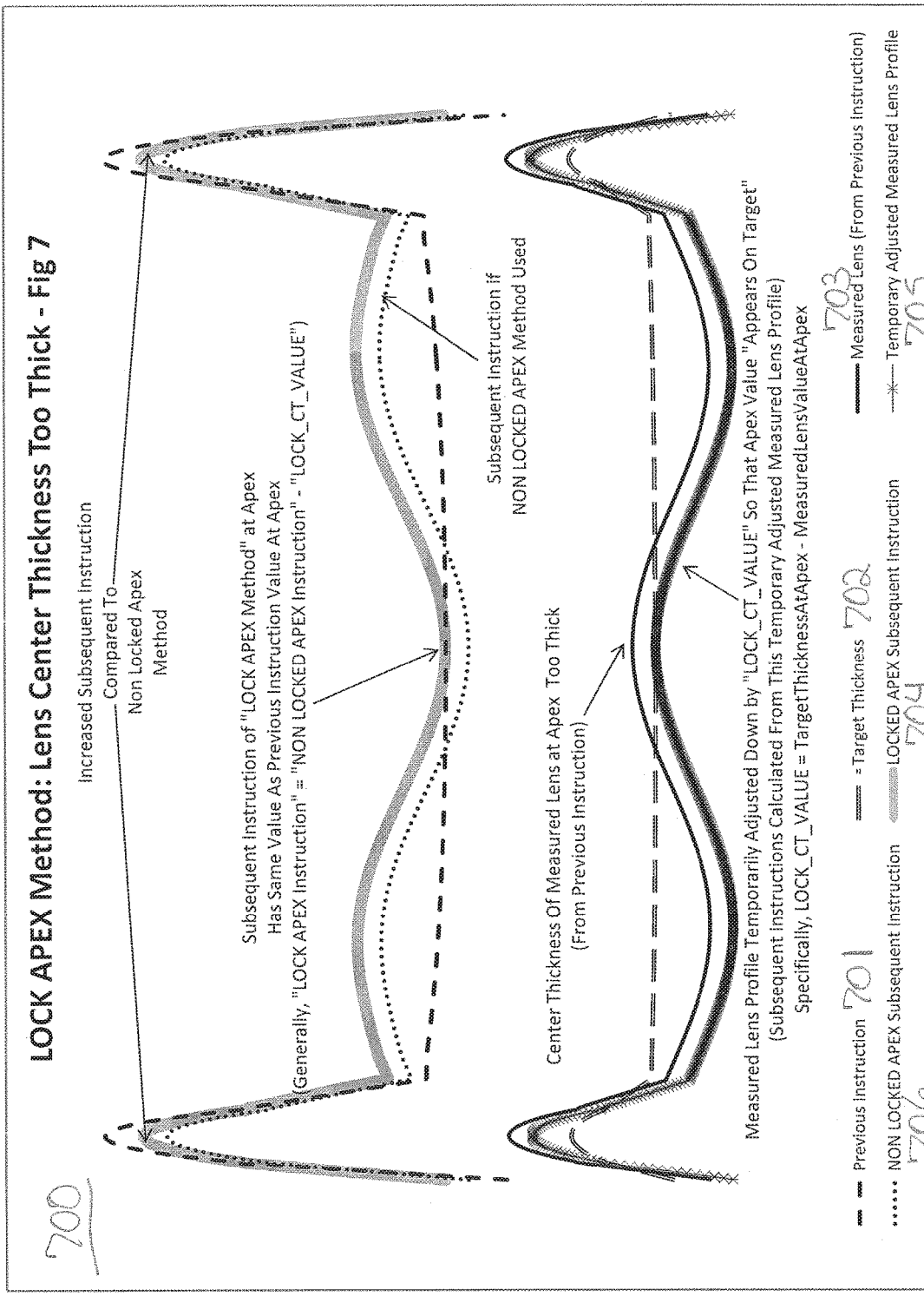

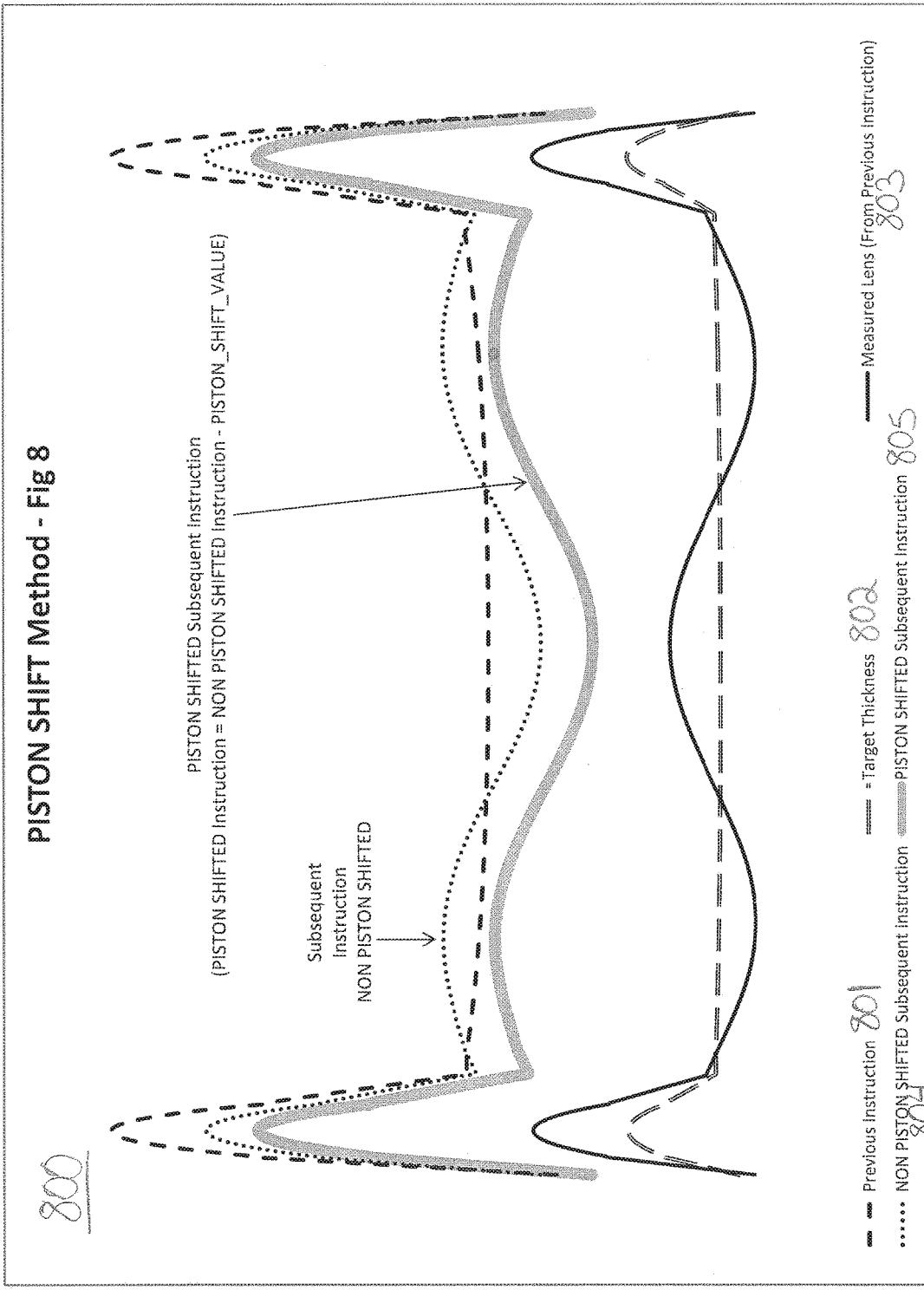

Fig. 9

For each, any or all points in the data set, the location of the point is specified in cartesian coordinate space as (Xi, Yi):
  Instruction given in mm
For each, any or all points in Measured Lens data set, given at an (x,y) location:
  Measured Lens Thicknesses given in mm
For each, any or all points in Target Thickness data set, given at an (x,y) location:
  Target Thicknesses given in mm Generically: Delta_Thickness = Target_Thickness − Measured Lens Thickness
Scaled Delta Thickness Value = (DeltaT_ * A)/100

900

901

| Convergence Method | Arithmetic | | | | | |
|---|---|---|---|---|---|---|
| Gain Factor (%) | 100 | | | | | |
| Iteration # | Thickness Target (mm) | Instruction Instruction_# | Measured Lens MLens_# | Delta Thickness DeltaT_# | Gain Factor (%) GF | Scaled Delta Thickness CScaled_# |
| Initial Show | 0.0900 | 0.1250 | 0.0750 | 0.0150 | 100.000 | 0.0150 |
| Iteration 1 | 0.0900 | 0.1400 | 0.0850 | 0.0050 | 100.000 | 0.0050 |
| Iteration 2 | 0.0900 | 0.1450 | 0.0940 | −0.0040 | 100.000 | −0.0040 |
| Iteration 3 | 0.0900 | 0.1410 | 0.0910 | −0.0010 | 100.000 | −0.0010 |
| Iteration 4 | 0.0900 | 0.1400 | 0.0900 | 0.0000 | 100.000 | 0.0000 |

902

| Convergence Method | Arithmetic | | | | | |
|---|---|---|---|---|---|---|
| Gain Factor (%) | 200 | | | | | |
| Iteration # | Thickness Target (mm) | Instruction Instruction_# | Measured Lens MLens_# | Delta Thickness DeltaT_# | Gain Factor (%) GF | Scaled Delta Thickness CScaled_# |
| Initial Show | 0.0900 | 0.1250 | 0.0750 | 0.0150 | 200.000 | 0.0300 |
| Iteration 1 | 0.0900 | 0.1550 | 0.0850 | 0.0050 | 200.000 | 0.0100 |
| Iteration 2 | 0.0900 | 0.1650 | 0.0940 | −0.0040 | 200.000 | −0.0080 |
| Iteration 3 | 0.0900 | 0.1570 | 0.0910 | −0.0010 | 200.000 | −0.0020 |
| Iteration 4 | 0.0900 | 0.1550 | 0.0900 | 0.0000 | 200.000 | 0.0000 |

903

| Convergence Method | Arithmetic | | | | | |
|---|---|---|---|---|---|---|
| Gain Factor (%) | 75 | | | | | |
| Iteration # | Thickness Target (mm) | Instruction Instruction_# | Measured Lens MLens_# | Delta Thickness DeltaT_# | Gain Factor (%) GF | Scaled Delta Thickness CScaled_# |
| Initial Show | 0.0900 | 0.1250 | 0.0750 | 0.0150 | 75.000 | 0.0113 |
| Iteration 1 | 0.0900 | 0.1363 | 0.0850 | 0.0050 | 75.000 | 0.0037 |
| Iteration 2 | 0.0900 | 0.1400 | 0.0940 | −0.0040 | 75.000 | −0.0030 |
| Iteration 3 | 0.0900 | 0.1370 | 0.0910 | −0.0010 | 75.000 | −0.0008 |
| Iteration 4 | 0.0900 | 0.1363 | 0.0900 | 0.0000 | 75.000 | 0.0000 |

904

| Convergence Method | Arithmetic | | | | | |
|---|---|---|---|---|---|---|
| Gain Factor (%) | Various | | | | | |
| Iteration # | Thickness Target (mm) | Instruction Instruction_# | Measured Lens MLens_# | Delta Thickness DeltaT_# | Gain Factor (%) GF | Scaled Delta Thickness CScaled_# |
| Initial Show | 0.0900 | 0.1250 | 0.0750 | 0.0150 | 100.000 | 0.0150 |
| Iteration 1 | 0.0900 | 0.1400 | 0.0850 | 0.0050 | 90.000 | 0.0045 |
| Iteration 2 | 0.0900 | 0.1445 | 0.0940 | −0.0040 | 200.000 | −0.0080 |
| Iteration 3 | 0.0900 | 0.1365 | 0.0910 | −0.0010 | 125.000 | −0.0013 |
| Iteration 4 | 0.0900 | 0.1353 | 0.0900 | 0.0000 | 75.000 | 0.0000 |

Fig. 10

Convergence Method Percentage
Gain Factor (%) 100

| Iteration # | Thickness Target (mm) Target_Instr_# | Instruction Instruction_# | Measured Lens MLens_# | Temporary Next Instruction Value Temp_Instr_# | Gain Factor (%) GF | Delta_Instruction (Next - Previous) Temp_Instr_# - Instruction_# | Required Delta Instruction (based off GFression Level) |
|---|---|---|---|---|---|---|---|
| Initial Show | 0.090 | 0.125 | 0.075 | 0.150 | 100.000 | 0.025 | 0.025 |
| Iteration 1 | 0.090 | 0.150 | 0.085 | 0.159 | 100.000 | 0.009 | 0.009 |
| Iteration 2 | 0.090 | 0.159 | 0.094 | 0.152 | 100.000 | -0.007 | -0.007 |
| Iteration 3 | 0.090 | 0.152 | 0.091 | 0.150 | 100.000 | -0.002 | -0.002 |
| Iteration 4 | 0.090 | 0.150 | 0.090 | 0.150 | 100.000 | 0.000 | 0.000 |

Convergence Method Percentage
Gain Factor (%) 200

| Iteration # | Thickness Target (mm) Target_Instr_# | Instruction Instruction_# | Measured Lens MLens_# | Temporary Next Instruction Value Temp_Instr_# | Gain Factor (%) GF | Delta_Instruction (Next - Previous) Temp_Instr_# - Instruction_# | Required Delta Instruction (based off GFression Level) |
|---|---|---|---|---|---|---|---|
| Initial Show | 0.090 | 0.125 | 0.075 | 0.150 | 200.000 | 0.025 | 0.050 |
| Iteration 1 | 0.090 | 0.175 | 0.085 | 0.185 | 200.000 | 0.010 | 0.021 |
| Iteration 2 | 0.090 | 0.196 | 0.094 | 0.187 | 200.000 | -0.008 | -0.017 |
| Iteration 3 | 0.090 | 0.179 | 0.091 | 0.177 | 200.000 | -0.002 | -0.004 |
| Iteration 4 | 0.090 | 0.175 | 0.090 | 0.175 | 200.000 | 0.000 | 0.000 |

Convergence Method Percentage
Gain Factor (%) 75

| Iteration # | Thickness Target (mm) Target_Instr_# | Instruction Instruction_# | Measured Lens MLens_# | Temporary Next Instruction Value Temp_Instr_# | Gain Factor (%) GF | Delta_Instruction (Next - Previous) Temp_Instr_# - Instruction_# | Required Delta Instruction (based off GFression Level) |
|---|---|---|---|---|---|---|---|
| Initial Show | 0.090 | 0.125 | 0.075 | 0.150 | 75.000 | 0.025 | 0.019 |
| Iteration 1 | 0.090 | 0.144 | 0.085 | 0.152 | 75.000 | 0.008 | 0.006 |
| Iteration 2 | 0.090 | 0.150 | 0.094 | 0.144 | 75.000 | -0.006 | -0.005 |
| Iteration 3 | 0.090 | 0.145 | 0.091 | 0.144 | 75.000 | -0.002 | -0.001 |
| Iteration 4 | 0.090 | 0.144 | 0.090 | 0.144 | 75.000 | 0.000 | 0.000 |

Initial_Instruction_0 (Start Show, does not have to be same as Target file)
Generically:

Let PREV = Previous Instruction
    Let GF = GFression Level
    Let TARGET = Target Thickness
    Let MEASURED = Measured Lens Thickness Then: Next Instruction = PREV + (((PREV x GF) x (TARGET - MEASURED)) / (MEASURED x 100))

Instruction_1 = PREV_0 + (((PREV_0 x GF) x (TARGET - MEASURED_0)) / (MEASURED_0 x 100))
    Instruction_2 = PREV_1 + (((PREV_1 x GF) x (TARGET - MEASURED_1)) / (MEASURED_1 x 100))
    Instruction_3 = PREV_2 + (((PREV_2 x GF) x (TARGET - MEASURED_2)) / (MEASURED_2 x 100))
    Instruction_4 = PREV_3 + (((PREV_3 x GF) x (TARGET - MEASURED_3)) / (MEASURED_3 x 100))

CONTOUR FORM CONTROL

CROSS REFERENCE TO RELATED APPLICATIONS

This application is a continuation of U.S. application Ser. No. 13/854,877, filed Apr. 1, 2013, which claims priority benefit to U.S. provisional application Ser. No. 61/618,073, filed Mar. 30, 2012, the disclosure of which is incorporated herein by reference.

FIELD OF USE

The present invention describes methods and apparatus to control manufacture of an article via contour forming apparatus. More specifically, in some embodiments, a contour forming apparatus may be controlled based upon a Convergence Process to manufacture a series of Contour Form Lenses until a Lens Design meets an Acceptance Criteria.

SUMMARY OF THE INVENTION

Accordingly, one aspect of this invention provides for implementing a Convergence Process to create a contour form contact Lens that meets an Acceptance Criteria of a Lens Design. For example, a DMD Show may create a Lens that does not meet an Acceptance Criteria wherein a Convergence Process may be initiated for a subsequent Iteration. In some embodiments of the present invention, there may be a variety of one or more of a masking technique, a Convergence modality, and a thickness correction method used during a Convergence Process.

In some other embodiments, a masking technique may include one or more of a radial masking technique, a sector masking technique, a segment masking technique, and an area masking technique, wherein Blend Zones may be applied if necessary. In some additional embodiments, a modality may include one or more of a one-sided Convergence modality and a two-sided Convergence modality. Accordingly, in related embodiments, one or both of an apex-locking technique and a piston-shifting technique may be used when performing one or both of a one-sided Convergence Modality and a two-sided Convergence modality.

Furthermore, in some embodiments, a thickness correction method may include one or more of a percentage thickness correction method, an arithmetic thickness correction method, and a secant thickness correction method. In some other embodiments, one of either of a uniform spatial gain method and a non-uniform spatial gain method may be applied when utilizing a thickness correction method. In yet some further embodiments, there may be multiple types of a non-uniform spatial gain method including a function-based non-uniform spatial gain method and a direct mapping non-uniform spatial gain method.

BRIEF DESCRIPTION OF DRAWINGS

FIG. 3 illustrates a graphical representation in flat space of a two-sided Convergence modality that may be used to implement some embodiments of the present invention.

FIG. 4 illustrates a graphical representation in flat space of a one-sided Convergence modality utilizing a thickening ratchet procedure that may used to implement some embodiments of the present invention.

FIG. 5 illustrates a graphical representation in flat space of a one-sided Convergence modality utilizing a thinning ratchet procedure that may be used to implement some embodiments of the present invention.

FIG. 6 and FIG. 7 illustrate graphical representations in flat space of an apex locking technique that may be used to implement some embodiments of the present invention.

FIG. 8 illustrates a graphical representation in flat space of a piston-shifting technique that may be used to implement some embodiments of the present invention.

FIG. 9 illustrates a display of data generated by utilizing an arithmetic thickness correction method with application of various gain magnitude factors that may be used to implement some embodiments of the present invention.

FIG. 10 illustrates a display of data generated by utilizing a percentage thickness correction method with application of various gain magnitude factors that may be used to implement some embodiments of the present invention.

DETAILED DESCRIPTION OF INVENTION

Figure 1:
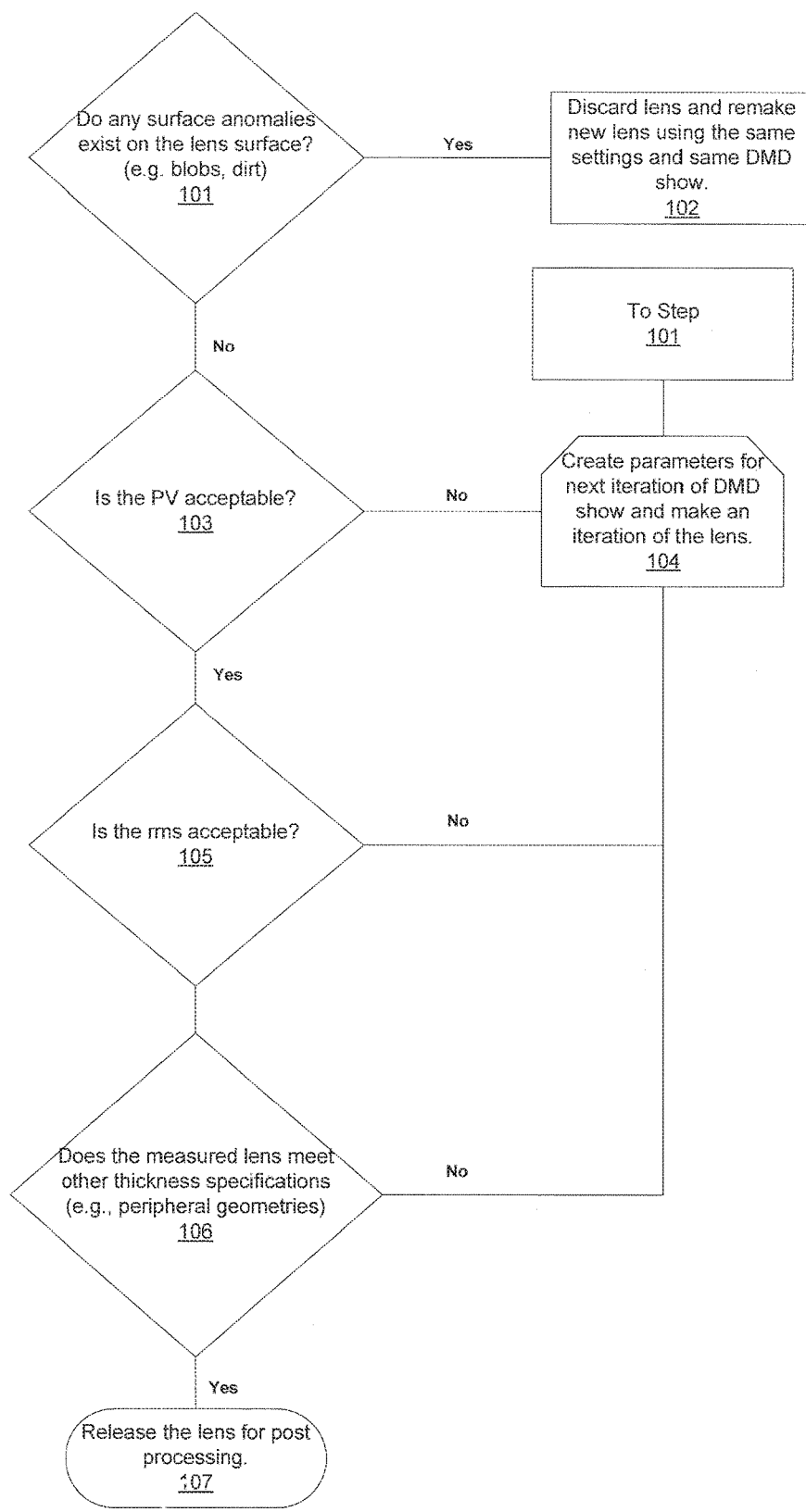
FIG. 1 illustrates methods steps that may be used to implement some embodiments of the present invention.

The present invention provides for methods and apparatus for one or both of creating and modifying a DMD show to create a Lens that Converge a Lens Design. In the following sections detailed descriptions of embodiments of the invention will be given. The description of both preferred and alternative embodiments though thorough are exemplary embodiments only, and it is understood that to those skilled in the art that variations, modifications and alterations may be apparent. It is therefore to be understood that said exemplary embodiments do not limit the broadness of the aspects of the underlying invention. Method steps described herein are listed in a logical sequence in this discussion however this sequence no way limits the order in which they may be implemented unless specifically stated.

GLOSSARY

In this description and claims directed to the presented invention, various terms may be used for which the following definitions will apply:

"Acceptance Criteria" as used herein, refers to one or both of specified parameter ranges and specified parameter values, such that if measured parameters of a fabricated Lens or Lens Precursor fall within a range or meet a value of one or both a Lens Design and a Desired Target File, the fabricated Product may be deemed acceptable.

"Blend Zone" as used herein means a contiguous area that blends one or both of a portion of a Lens to another adjoining portion of a Lens, and a portion of a DMD Show to another adjoining portion of a DMD Show.

"Catalog Item" as used herein, refers to a file, feature, component, design, data or descriptor that may temporarily or permanently stored in various embodiments, such as libraries or databases, and may be recalled for use without having to recreate them.

"Contour Forming Device" as used herein, refers to equipment and methods for fabricating one or more of a Lens Precursor Form, a Lens Precursor, and a Lens wherein the device may involve, for example, the use of actinic radiation, Reactive Mixture, and DMD devices.

"Convergence" (also sometimes referred to herein as: "Convergence Process" or "Converge" with the same meaning as "Convergence Process") as used herein, refers to the process of modifying DMD Files and using the modified DMD Files in an Iterative Loop until subsequent fabricated Lens parameters satisfy one or both of a specified Acceptance Criteria and a Desired Target File.

"Curved Space" as used herein, refers to a coordinate mapping space (e.g., Cartesian, polar, spherical, etc) where curvature of a design has not been removed.

"Custom Product" as used herein, refers to a Product including one or more parameters that may be available in other than incremental steps. Custom Product parameters allow for more precise sphere power, cylinder power, and cylinder axis (e.g., −3.125D/−0.47D×18°) than Standard Product parameters, and may include base curves, diameters, and stabilization profiles, and thickness profiles based upon a particular use of a Product offered.

"Desired Target File" as used herein, "Desired Target File" or "Target File" refers to data that may represent one or more of a Lens Design, a Thickness Map, a Lens Precursor design, a Lens Precursor Form design, a Lens Precursor Feature design, and combinations of the above. A Desired Target File may be represented in either a hydrated or un-hydrated state, in Flat or Curved Space, in 2-dimensional or 3-dimensional space, and by methods including but not limited to, geometric drawings, power profile, shape, features, thicknesses etc. Desired Target Files may contain data on a regularly or irregularly spaced grid.

"Digital Core Break" as used herein, refers to a range of Product where select Lens Precursor Features or control parameters or other features may be identical and may remain constant within a specified Product range.

"DMD" as used herein, refers to a digital micromirror device that is a bistable spatial light modulator consisting of an array of movable micromirrors mounted over a CMOS SRAM.

Each mirror may be independently controlled by loading data into the memory cell below the mirror to steer reflected light, spatially mapping a pixel of video data to a pixel on a display. The data electrostatically controls the mirror's tilt angle in a binary fashion, where the mirror states are either +X degrees ("on") or −X degrees ("off"). For example, with current devices, X may be either 10 degrees or 12 degrees (nominal); future devices may have different tilt angles. Light reflected by the "on" mirrors is passed through a projection Lens and onto a screen. Light reflected by the "off" mirrors creates a dark field, and defines the black-level floor for the image. Images are created by gray-scale modulation between "on" and "off" levels at a rate fast enough to be integrated by the observer. Each mirror may receive a number of instructions from one, none, or a plurality of DMD Shows. Select mirrors may be turned "on" during the Lens fabrication process. DMDs (digital micromirror device) may be found in DLP projection systems.

"DMD Control Software" as used herein, refers to software that organizes and utilizes DMD Files and DMD Shows that may enable fabrication of Lens Precursors, or Lens Precursor Features.

"DMD Show" as used herein "DMD Show" or "DMD File" refers to a collection of one or both of time based instructional data points and thickness based instructional data points that may be used to activate mirrors on a DMD, and enable a Lens or Lens Precursor or Lens Precursor Form or Lens Precursor Feature(s) to be fabricated. A DMD Show may have various formats, with (x,y,t), and (r, θ, t) being the most common where, for example "x" and "y" are Cartesian coordinate locations of DMD mirrors, "r" and "θ" are Polar coordinate locations of DMD mirrors, and "t" represents time instructions controlling DMD mirror states. DMD Shows may contain data on a regularly or irregularly spaced grid.

"Fabrication Process Conditions" as used herein, refers to settings, conditions, methods, equipment and processes used in fabrication of one or more of a Lens Precursor, a Lens Precursor Form, and a Lens.

"Filtering" as used herein, refers to the process including one or more of defining, detecting, removing, and correcting errors in given data, in order to minimize the impact of errors in input data on succeeding analyses.

"Flat Space" as used herein, refers to coordinate mapping space (e.g., Cartesian, polar, spherical, etc) where curvature of a design being considered has been removed.

"Fluent Lens Reactive Media" as used herein, means a Reactive Mixture that is flowable in either its native form, reacted form, or partially reacted form and may be formed upon further processing into a part of an ophthalmic Lens.

"Free-form" as used herein "free-formed" or "free-form", (also sometimes referred to herein as: "contour formed" or "contour form" with the same meaning as "contour formed"), refers to a surface that is formed by crosslinking of a Reactive Mixture via exposure to actinic radiation on a voxel by voxel basis, with or without a fluent media layer, and is not shaped according to a cast mold, lathe, or laser ablation. Detailed description of Free-form methods and apparatus are disclosed in U.S. patent application Ser. No. 12/194,981 (VTN5194USNP) and in U.S. patent application Ser. No. 12/195,132 (VTN5194USNP1).

"Iteration" as used herein, refers to the creation of a subsequent DMD File/DMD Show that is subsequently, used in the Convergence Process to satisfy Acceptance Criteria.

"Iterative Loop" as used herein, refers to one, or a series of process steps that may enable one or more of a Lens, a Lens Precursor, and a Lens Precursor Feature fabrication such that each time through a loop, one or more of a Lens, Lens Precursor, and a Lens Precursor Feature may be more conformal to a desired Lens Design, than its predecessor. A Convergence Process may contain one or more Iterative Loops wherein one or both of DMD Shows and Fabrication Process Conditions may be modified.

"Lens" as used herein, "Lens" or "lens" refers to any ophthalmic device that resides in or on the eye. These devices may provide optical correction or may be cosmetic. For example, the term Lens may refer to a contact Lens, intraocular Lens, overlay Lens, ocular insert, optical insert or other similar device through which vision is corrected or modified, or through which eye physiology is cosmetically enhanced (e.g., iris color) without impeding vision. In some embodiments, the preferred Lenses of the invention are soft contact Lenses and are made from silicone elastomers or hydrogels, which include but are not limited to silicone hydrogels, and fluorohydrogels.

"Lens Design" as used herein, refers to form, function or both of a desired Lens, which if fabricated, may provide optical power correction, acceptable Lens fit (e.g., corneal coverage and movement), acceptable Lens rotation stability, etc. Lens Designs may be represented in either a hydrated or un-hydrated state, in Flat or Curved Space, in 2-dimensional or 3-dimensional space, and by a method including one or more of, geometric drawings, power profile, shape, features, thicknesses etc. Lens Designs may contain data on a regularly or irregularly spaced grid.

"Lens Precursor" as used herein, means a composite object consisting of a Lens Precursor Form and Fluent Lens Reactive Media in contact with a Lens Precursor Form that may be rotationally symmetrical or non-rotationally symmetrical. For example, in some embodiments Fluent Lens Reactive Media may be formed in the course of producing a Lens Precursor Form within a volume of Reactive Mixture. Separating a Lens Precursor Form and Fluent Lens Reactive Media from a volume of Reactive Mixture used to produce a Lens Precursor Form may generate a Lens Precursor. Additionally, a Lens Precursor may be converted to a different entity by either the removal of an amount of Fluent Lens Reactive Media or the conversion of an amount of Fluent Lens Reactive Media into non-fluent incorporated material.

"Lens Precursor Feature", also referred to as "feature", as used herein, refers to a non-fluent substructure of a Lens Precursor Form, and acts as an infrastructure for a Lens Precursor. Lens Precursor Features may be defined empirically or described mathematically by control parameters (height, width, length, shape, location, etc.,) may be are fabricated via DMD Show instructions. Examples of Lens Precursor Features may include one or more of the following: a Lens Edge feature, a Stabilization Zone feature, a Smart Floor Volumator feature, an Optic Zone feature, a Moat feature, a Drain Channel feature, etc. Lens Precursor Features may be fabricated using Actinic Radiation Voxels and may be incorporated into an ophthalmic Lens upon further processing.

"Lens Precursor Form" as used herein, refers to a non-fluent object, which may be consistent with being incorporated upon further processing into an ophthalmic Lens.

"Product" as used herein, refers to one or more of a Lens, a Lens Precursor, and a Lens Precursor Form and may include either "Standard Product" or "Custom Product".

"PV" (Peak to Valley) as used herein, refers to the difference between the highest point and the lowest point on a surface of one or more of a measured Lens Precursor, a measured Lens Precursor Form, and a measured Lens for one or both of a whole surface, and a specified region, (e.g., an optic zone), and may be part of an Acceptance Criteria.

"RMS" (Root Mean Square) as used herein, refers to the smoothness of one or more of a measured Lens Precursor, a measured Lens Precursor Form, and a measured Lens for one or both of a whole surface, and a specified region, (e.g., an optic zone), and may be part of an Acceptance Criteria.

"Standard Product" as used herein, refers to a Product with limited Product parameter availability, such as those offered in discrete steps. For example, sphere power parameters may only be available in 0.25D steps (e.g., −3.00D, 3.25D, −3.50D, etc.); cylinder power parameters may only be available in 0.50D steps (e.g, −0.75D, −1.25D, −1.75D, etc.); and cylinder axis parameters may only be available in 10° steps (e.g., 10°, 20°, 30°, etc.). Other Standard Product parameters and features offered in discrete steps include but are not limited to base curve radii, diameter, stabilization profiles and thickness profiles.

"Substrate" as used herein, refers to a physical entity upon which other entities may be placed or formed.

"Surface Fitting" as used herein, refers to the process of constructing a surface or mathematical function that has the best fit to a series of data points, possibly subject to constraints. Surface Fitting can involve either interpolation, where an exact fit to the data is required, or smoothing, in which a "smooth" function is constructed that approximately fits the data.

"Thickness Map" as used herein, refers to a 2-dimensional or 3-dimensional thickness profile representation of a desired Product, Lens Precursor Form, or Lens Precursor. Thickness Maps may either be in Flat or Curved Space coordinate space and may contain data on a regularly or irregularly spaced grid.

"Training Region" as used herein, refers to one or both of a whole Lens, and one or more portions of a Lens, that may be iterated upon during a Convergence Process.

"Voxel" as used herein, also referred to as "Actinic Radiation Voxel" is a volume element, representing a value on a regular or irregular grid in 3-dimensional space. A Voxel may be viewed as a three dimensional pixel, however, wherein a pixel represents 2D image data a Voxel includes a third dimension. In addition, wherein Voxels are frequently used in the visualization and analysis of medical and scientific data, in the present invention, a Voxel is used to define the boundaries of an amount of actinic radiation reaching a particular volume of Reactive Mixture, thereby controlling the rate of crosslinking or polymerization of that specific volume of Reactive Mixture. By way of example, Voxels are considered in the present invention as existing in a single layer conformal to a 2-D mold surface wherein the Actinic Radiation may be directed normal to the 2-D surface and in a common axial dimension of each Voxel. As an example, specific volume of Reactive Mixture may be crosslinked or polymerized according to 768×768 Voxels.

In some embodiments, a Lens may be fabricated based upon a desired Lens Design, via the use of DMD Shows. Furthermore, a fabricated Lens may not conform to an Acceptance Criteria of a Lens Design wherein an Iteration of a previous DMD Show may have to occur. For example, an Iteration of a previous DMD Show may enable closer Convergence of a desired Lens Design.

Referring now to FIG. 1, a flowchart illustrates method steps that may be followed to implement some embodiments of the present invention. At 101, in some embodiments, a Lens surface may be examined for surface anomalies (e.g., blobs, dirt, etc), that may be present on a Lens surface. At 102, upon determination that surface anomalies are present on a Lens surface, a Lens may be discarded and a new Lens remade for example, by utilizing the same settings of a previous DMD Show. At 103, upon determination that surface anomalies are not present on a Lens surface, a PV value may be determined. If a PV is not acceptable, at 104, parameters for a subsequent Iteration of a DMD Show may be created and a new Lens made. If a PV is acceptable, at 105, a determination may be made of whether a RMS is in a desired optic zone. If a RMS is not acceptable, at 104, parameters for a subsequent DMD Show may be created and a new Lens made. If a RMS is acceptable, at 106, a determination may be made of whether a measured Lens meets other thickness specifications (e.g., peripheral geometries). If other thickness specifications are not acceptable, at 104, parameters for a subsequent Iteration of a DMD Show may be created and an Iteration of a Lens made. If other thickness specifications are acceptable, at 107, a Lens may be released for post processing.

As discussed in the aforementioned method steps, there may be cases when a previous DMD Show creates a Lens that does not conform to an Acceptance Criteria of a Lens Design and a subsequent Iteration may be needed.

In some embodiments, there may be a variety of one or more: techniques, modalities, and methods utilized during a Convergence Process. In other related embodiments, when performing a Convergence Process, a subsequent DMD Show instruction for a subsequent Iteration may be one or both of an altered previous DMD Show instruction, a combination of a previous show instruction and one or more of another DMD Show instruction, and a combination of two or more DMD Shows. For example, two or more portions from one or multiple DMD Shows may be combined together for a subsequent Iteration. Accordingly, an Iterative Loop of a Convergence Process may be continuously repeated until a Lens meets an Acceptance Criteria of a Lens Design.

In some aspects of the present invention, a masking technique may be implemented during a Convergence Process. In some embodiments, a masking technique may include one or more of a radial masking technique, a sector masking technique, a segment masking technique, and an area masking technique. In some related embodiments, one or more of a masking technique may be applied to either: one DMD Show, and two or more DMD Shows that may be used in a subsequent Iteration. Additionally, in some other embodiments, one or more of a masking technique may be applied to a Training Region of a Lens that may include one or both of a whole Lens, and one or more of a portion of a Lens.

Furthermore, in some additional embodiments, performing a masking technique may be used to further Converge a Lens Design even if a measured Lens already meets a desired Acceptance Criteria. For example, a PV of a measured Lens may be acceptable, but performing a masking technique in a subsequent Iteration may cause Convergence of a Lens Design even more closely and therefore, enable better performance of a Lens such as improving vision with even more precision than it may have been without using a masking technique.

Referring now to FIGS. 2a-2d, illustrate various examples of different masking techniques, in flat space. In some embodiments, when implementing a masking technique a user may specify one or more of a boundary inside of which a DMD Show may be used, and outside of which a different DMD Show may be used.

Figure 2A:
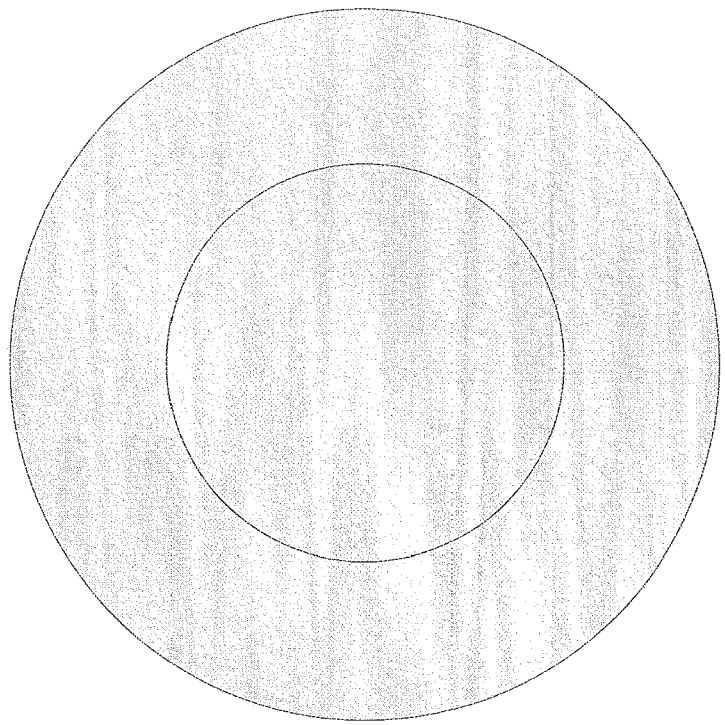
FIG. 2a illustrates an example of a radial masking technique that may be used to implement some embodiments of the present invention.

Referring now to FIG. 2a, illustrates an example of a radial masking technique applied to a DMD Show. In some embodiments, for example, when using a radial masking technique for a subsequent Iteration, one or more portions of one or more DMD Shows, may be specified to occur within a certain radius. Additionally, one or more portions of one or more different DMD Shows may be specified to occur within one or both of one or more radii of a Lens Design, and an entire remaining portion of a Lens Design.

Figure 2B:
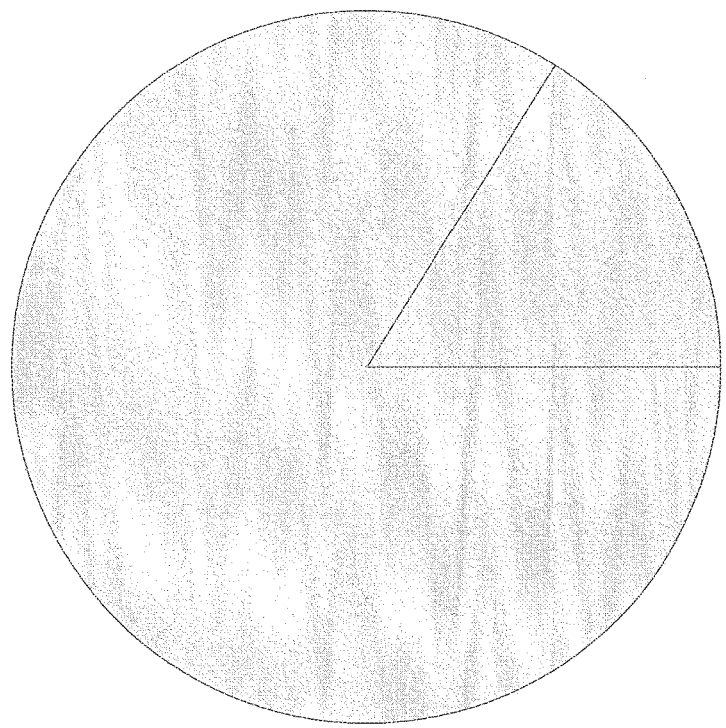
FIG. 2b illustrates an example of a sector masking technique that may be used to implement some embodiments of the present invention.

Referring now to FIG. 2b, illustrates an example of a sector masking technique applied to a DMD Show. In some embodiments, for example, when using a sector masking technique for a subsequent Iteration, one or more portions of one or more DMD Shows, may be specified to occur within a certain sector. Additionally, one or more portions, of one or more different DMD Shows may be specified to occur within one or both of one or more sectors of a Lens Design, and an entire remaining portion of a Lens Design.

Figure 2C:
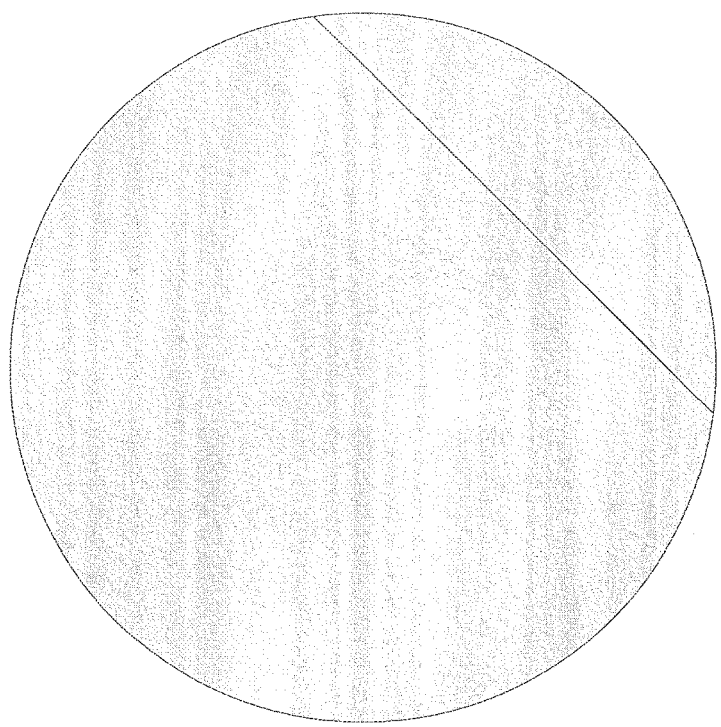
FIG. 2c illustrates an example of a segment masking technique that may be used to implement some embodiments of the present invention.

Referring now to FIG. 2c, illustrates an example a segment masking technique applied to a DMD Show. In some embodiments, for example, when using a segment masking technique for a subsequent Iteration, one or more portions of one or more DMD Shows, may be specified to occur within a certain segment. Additionally, one or more portions, of one or more different DMD Shows may be specified to occur within one or both of one or more segments of a Lens Design, and an entire remaining portion of a Lens Design.

Figure 2D:
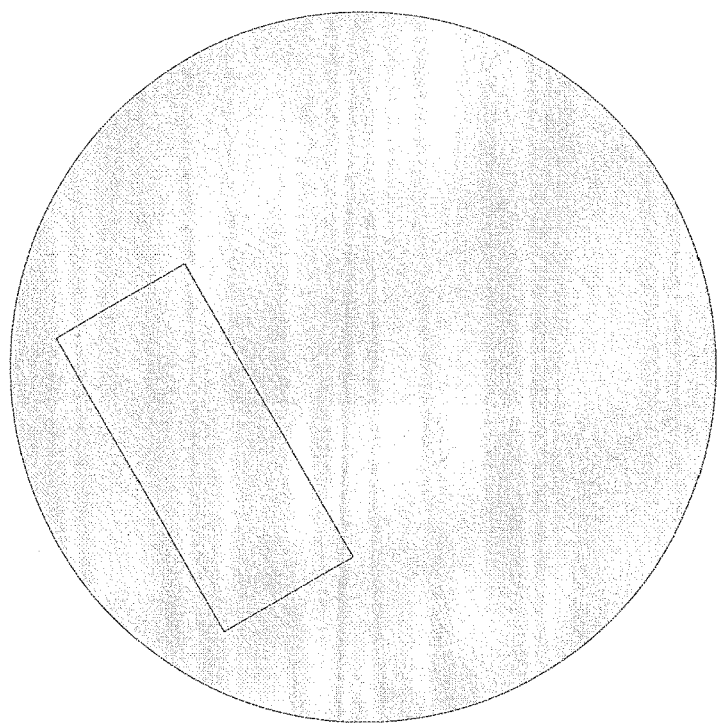
FIG. 2d illustrates an example of an area masking technique that may be used to implement some embodiments of the present invention.

Referring now to FIG. 2d, illustrates an example an area masking technique applied to a DMD Show. In some embodiments, for example, when using an area masking technique for a subsequent Iteration, one or more portions of one or more DMD Shows, may be specified to occur within a certain area. Additionally, one or more portions, of one or more different DMD Shows may be specified to occur within one or both of one or more areas of a Lens Design, and an entire remaining portion of a Lens Design.

Figure 2E:
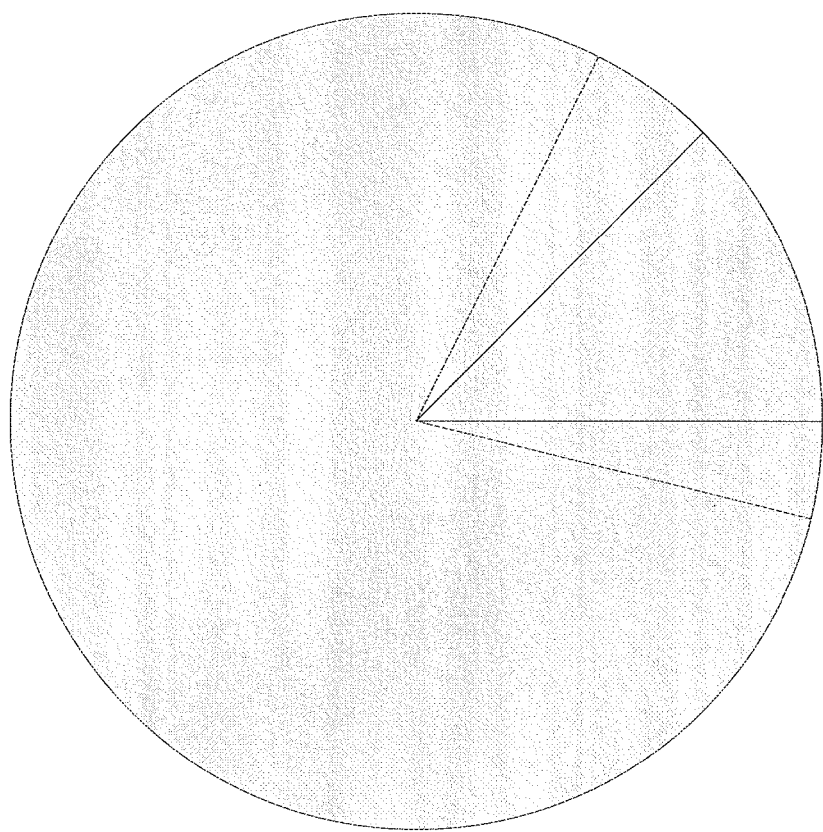
FIG. 2e illustrates an example of Blend Zones that may be used to implement some embodiments of the present invention.

In some other embodiments, one or more of a Blend Zone may be specified when using a masking technique. For example, one or more of a Blend Zone may be applied when implementing a masking technique and two or more portions taken from either one DMD Show or two or more DMD Shows, do not connect to one another when they are combined together in a subsequent DMD Show, as illustrated in FIG. 2e.

In some additional aspects of the present invention, there may be different Convergence modalities implemented during a Convergence Process either, by one or both of a one-sided Convergence modality, and a two-sided Convergence modality. In some embodiments, a two-sided Convergence modality may be used when performing an Iteration of a previous DMD Show to Converge a Lens Design in a subsequent DMD Show. For example, a previous show may create parts of a Lens that may be either one or both of thicker than a Lens Design, and thinner than a Lens Design. In some related embodiments, when performing a two-sided Convergence modality, an Iteration for a subsequent DMD Show may occur by adjusting one or more of a parameter of both of an instruction that resulted in a Lens with both one or more thicker areas and one or more thinner areas, than called for in a Lens Design. Adjustments may occur at each pixel of a previous show for a subsequent show.

In some further embodiments, a one-sided Convergence modality may also be implemented to Converge a Lens Design in a subsequent DMD Show. In other related embodiments, when performing an Iteration of a previous DMD Show, a one-sided Convergence modality may be performed by utilizing either one or both of a thickening ratchet instruction, and a thinning ratchet instruction. For example, a previous DMD Show may create areas of a Lens that may be either one or both of thicker than a Lens Design, and thinner than a Lens Design. Iterations for a subsequent show instruction may occur by one of either adjusting one or more parameters of an instruction that needs to be decreased in value, and of an instruction that needs to be increased in value. Accordingly, adjustments may occur at each pixel of selected areas for a subsequent show instruction.

Referring now to FIG. 3, illustrates a graphical representation in flat space, of implementing a two-sided Convergence modality. In this example, the previous DMD instruction 301 created the measured Lens 303 with areas of the Lens that were both thinner than the target thickness 302, and thicker than the target thickness 302 of the desired Lens Design.

At 300, illustrates applying a two-sided Convergence modality to the subsequent DMD instruction 304. The subsequent DMD Show instruction 304 results in decreasing instruction in areas of the previous DMD Show instruction 301 that created regions that were too thick on the measured Lens 303, in comparison to the target thickness value 302. Additionally, the subsequent DMD Show instruction results increasing instruction in areas of the previous DMD Show instruction 301 that created regions that were too thin on the measured Lens 303, in comparison to the target thickness value 302.

Referring now to FIG. 4, illustrates a graphical representation in flat space, of implementing a one-sided Convergence modality by utilizing a thickening ratchet instruction. In this example, the previous DMD instruction 401 created the measured Lens 403 with areas that were both thicker than the target thickness and thinner than the target thickness 402 of the Lens Design.

At 400, illustrates applying a one-sided Convergence modality by utilizing a thickening ratchet instruction 405 in the subsequent DMD Show instruction 404. The subsequent DMD instruction 404 results in an increasing instruction only in areas of the previous DMD Show instruction 401 that created regions that were too thin on the measured Lens 403, in comparison to the target thickness value 402. Additionally, the subsequent DMD instruction 404 remains unchanged from the previous show instruction 401 that created regions of the measured Lens 403 that were too thick, in comparison to the target thickness value 402. Therefore, for the subsequent Iteration, adjustments occur only to portions of the previous show that resulted in regions that were too thin on the measured Lens 403 while other areas remain unchanged in the subsequent DMD instruction 404.

Referring now to FIG. 5, illustrates a graphical representation in flat space, of a one-sided Convergence technique by utilizing a thinning ratchet instruction. In this example, the previous DMD instruction 501 created the measured Lens 503 with areas that were both, thicker and thinner than the target thickness 502 of the Lens Design.

At 500, illustrates applying a one-sided Convergence modality by utilizing a thinning ratchet instruction 505 for in subsequent DMD Show instruction 504. The subsequent DMD instruction 504 results in only decreasing instruction of the previous DMD Show instruction 501 that created regions that were too thick on the measured Lens 503, in comparison to the target thickness 502. Additionally, the subsequent DMD instruction 504 remains unchanged from the previous show instruction 504 that created areas of the measured Lens 503 that were too thin, as compared to the target thickness value 502. Therefore, for the subsequent Iteration, adjustments occur only to portions of the previous show that resulted in regions that were too thick on the measured Lens 503 while other areas remain unchanged in the subsequent DMD instruction 504.

In some further aspects of the present invention, various techniques including one or both of an Apex locking technique and a piston-shifting technique may be applied when implementing one or more the aforementioned Convergence modalities. In some embodiments, when performing an apex-locking technique an instruction at an apex from a previous DMD Show may be adjusted up to a target thickness value. Furthermore, other selected areas of a previous instruction may be adjusted up uniformly by a same amount as an apex value and an apex may be locked so that it may be kept constant for other subsequent DMD Shows.

For example, when locking an apex control, instruction at an apex ($I_{CT}$) may be adjusted up to a target thickness apex value and kept the same; this measured distance between an $I_{CT}$ and a target thickness apex is a lock CT value. Furthermore, in some embodiments, a lock CT value ($\Delta^{th}$), may be calculated by taking the difference between an $I_{CT}$ of a previous show and a target thickness apex value of that same show. Subsequently, $\Delta^{th}$ may be added to every point of an entire measured Lens surface, and may become a "modified" Lens thickness file for a subsequent DMD Show. Consequently, a subsequent DMD Show instruction may create a "modified" measured Lens and subsequently, be compared to a Lens Design.

Additionally, in some other embodiments, performing an apex locking technique may be used to further Converge a Lens Design even if a measured Lens already meets a desired Acceptance Criteria. For example, a PV of a measured Lens may be acceptable, but performing an apex locking technique in a subsequent Iteration may cause Convergence of a Lens Design even more closely and therefore, enable better performance of a Lens such as improving vision with even more precision than it may have been without using an apex locking technique.

Referring now to FIG. 6 and FIG. 7, FIG. 6, illustrates a graphical representation in flat space, of utilizing an apex locking technique when a Lens center thickness is too thin, and FIG. 7, illustrates a graphical representation in flat space, of utilizing an apex locking technique when a Lens center thickness is too thick. Additionally, both FIG. 6 and FIG. 7, are examples in flat space, of a comparison between a subsequent locked apex DMD instruction wherein the $I_{CT}$ remains the same as in the previous show instruction 601 and 701, and a subsequent non-locked apex DMD instruction 606 and 706, wherein the $I_{CT}$ may not remain the same as in the previous show instruction 601 and 701. Referring now again to FIG. 6, in this example, the previous DMD instruction 601 created the measured Lens 603, where the $I_{CT}$ is thinner than the target thickness 602 apex value of the desired Lens Design. Referring now again to FIG. 7, in this example, the previous DMD instruction 701 created the measured Lens 703, where the $I_{CT}$ is thicker than the target thickness 702 apex value of the desired Lens Design.

Referring now again to both FIG. 6, at 605, and FIG. 7, at 705, the temporary adjusted measured Lens profile is created by comparing the difference between the $I_{CT}$ value of the measured Lens 603 and 703, and the target thickness apex value 602 and 702, and adjusting the subsequent instruction by $\Delta^{th}$. At 606 and at 706, the subsequent non-locked apex instruction is calculated by adding $\Delta^{th}$ to every point on the entire measured Lens 603 and 703, surface of a temporary adjusted measured Lens profile 605 and 705, plus any selected additional amount and thereby, adjusting a subsequent instruction by that total amount. At 604 and 704, the apex lock instruction is calculated by taking the difference of the non-locked apex instruction 606 and 706, and the $\Delta^{th}$, and subsequently, adding the difference to every point on the measured Lens 603 and 703, surface except to the $I_{CT}$. Accordingly, the $I_{CT}$ remains the same as in the previous DMD instruction 601 and 701, and is kept constant during subsequent Iterations when going through an Iterative Loop of a Convergence Process.

In some other additional aspects of the present invention, when performing a piston-shifting technique a uniform shift of a previous DMD Show instruction may be done to one or more selected portions of a previous instruction by a selected amount. Additionally, in some other embodiments, performing a piston shifting technique may be used to further Converge a Lens Design even if a measured Lens already meets a desired Acceptance Criteria. For example, a PV of a measured Lens may be acceptable, but performing a piston shifting technique in a subsequent Iteration may cause Convergence of a Lens Design even more closely and therefore, enable better performance of a Lens such as improving vision with even more precision than it may have been without using a piston shifting technique.

Referring now to FIG. 8, illustrates a graphical representation in flat space, of utilizing a piston-shifting technique. Additionally, at 800, is an example in flat space of a comparison between a subsequent piston shifted DMD instruction, wherein a uniform shift of one or more selected portions of the instruction of the previous show are adjusted by a same amount, and a subsequent non-piston shifted DMD instruction. In this example, the previous DMD instruction 801 created the measured Lens 803, with areas of the Lens that were both thicker and thinner than the target thickness 802 of the desired Lens Design. At 804, the subsequent non-piston-shifting instruction results by non-uniformly adjusting one or more of a selected portion of the previous DMD instruction 801 by one or more of various selected amounts. At 805, the subsequent piston-shift instruction results by uniformly shifting one or more of a selected portion of the previous DMD Show instruction 801 by a same selected amount.

In some aspects of the present invention, various thickness correction methods may be utilized in a Convergence Process to calculate a subsequent DMD Show instruction including one or more of an arithmetic thickness correction method, a percentage thickness correction method, and a secant thickness correction method. In cases where a Lens may not meet an Acceptance Criteria, a thickness correction method may be selected based upon observation made by someone skilled in the art.

In some embodiments, adjustments may be made at each pixel of a previous DMD Show using a selected thickness correction method to calculate a DMD Show instruction for a subsequent Iteration. In some related embodiments, selected data points of a previous show may go through one or both of a Filtering process and a Surface Fitting process for a subsequent DMD Show prior to applying a thickness correction method. In additional embodiments, a DMD Show may be Iterated to affect certain or specific areas of a Lens. Accordingly, for example, subsequent Iterations of a previous DMD Show may result in one or more of changing a whole Lens, one or both of reducing certain apertures of a Lens and increasing certain apertures of a Lens (e.g., optic zone, peripheral zone), and changing select regions of a Lens.

Additionally, in some embodiments, various gain magnitude factors may be applied to a calculation of a subsequent DMD Show instruction. Furthermore, a gain magnitude factor may be changed mid-stream during subsequent Iterations. For example, a gain factor of 200% applied to Iteration 3 may be dropped down to 150% at Iteration 5.

In some embodiments, if a DMD Show creates a Lens that does not meet an Acceptance Criteria, an arithmetic thickness correction method may be used to calculate instructions for an Iterative DMD Show. Referring now to FIG. 9, illustrates a display of data generated by utilizing an arithmetic thickness correction method to calculate subsequent DMD Show instructions at different iterations and applying various gain magnitude factors.

In some related embodiments, to calculate an Iteration value for a subsequent DMD Show instruction set using an arithmetic thickness correction method, a Delta thickness value may have to be calculated. For example, a Delta thickness value may be equal to a target thickness value of a target design minus a measured Lens thickness value created from a previous DMD Show. Subsequent to a calculation of a Delta thickness value, a Delta thickness value may be multiplied with an applicable gain magnitude factor amount selected and divided by 100, to determine a scaled Delta thickness value. A scaled Delta thickness value may be added to a value of a previous show instruction. In some embodiments, use of the aforementioned formula may occur at each pixel of a previous show to calculate a new value for each pixel for a subsequent DMD Show.

More specifically, at 902, is an example of utilizing an arithmetic thickness correction method and applying a 200% gain magnitude factor to subsequent Iterations of the previous show, wherein the target thickness value of the Lens Design is 0.0900 µm and the measured Lens thickness is 0.0750 µm. In this example, the Delta thickness value is 0.0150 µm, which is calculated by subtracting the measured Lens thickness of 0.0750 µm from the target thickness value of 0.0900 µm. Furthermore, the scaled Delta thickness value is 0.0300 µm, which is calculated by multiplying the Delta thickness value of 0.0150 µm by the gain magnitude factor of 200%, and dividing that value by 100. Subsequently, the scaled Delta thickness value of 0.0300 µm is added to the previous show value of 0.1250 µm, giving the subsequent show instruction value of 0.1550 µm.

In yet, some further embodiments, if a DMD Show creates a Lens that does not meet desired Acceptance Criteria a percentage thickness correction method may be used to calculate instructions for an Iterative DMD Show. Referring now to FIG. 10, illustrates a display of data generated by utilizing a percentage thickness correction method to calculate subsequent DMD Show instructions at different iterations and applying various gain magnitude factors.

In some related embodiments, to calculate an Iteration value for a subsequent DMD Show instruction set utilizing a percentage thickness correction method, a Delta instruction value may have to be calculated. For example, a Delta instruction value may be equal to taking a previous show value and multiplying it by an applicable gain magnitude factor followed by, multiplying the resulting value by a target thickness value minus a measured Lens value. Furthermore, the preceding value is divided by a measured Lens value, followed by multiplying the resulting value by 100 and subsequently, adding the value to a previous show value. In some embodiments, use of the aforementioned formula may occur at each pixel of a previous show to calculate a new value for each pixel for a subsequent DMD Show.

More specifically, at 1002, is an example of utilizing a percentage thickness correction method calculation and applying a 200% gain magnitude factor to subsequent Iterations of an initial show, wherein the initial show is 0.125 µm, the target thickness is 0.090 µm, and the measured Lens thickness is 0.0750 µm. In this example, the subsequent DMD Show instruction is calculated by multiplying the initial show value of 0.125 µm by 200%, followed by multiplying this value by 0.015 µm, which is value of the difference of the target thickness value of 0.090 µm, and the measured Lens value of 0.075 µm, equaling the value of 0.00375 µm. Subsequently, the Delta instruction a value of 0.05 µm is calculated by dividing the value of 0.00375 µm by the measured Lens value of 0.075 µm. Furthermore, the previous show value of 0.125 µm is subsequently added to the Delta instruction value of 0.05 µm, resulting in the subsequent DMD Show instruction value of 0.175 µm.

In some additional embodiments, an Iteration value for a subsequent DMD Show instruction set may be determined by utilizing a secant thickness correction method, which may be calculated by using a secant method algorithm. A secant method is a root-finding algorithm that uses a succession of roots of secant lines to better approximate a root of a function ƒ, and is known to those skilled in the art.

In some other related embodiments of the present invention, various spatial gain methods may be applied when using one or more of the aforementioned thickness correction methods. In some embodiments, spatial gain methods may include one or both of a uniform (linear) spatial gain method, and a non-uniform spatial gain method. Furthermore, a non-uniform spatial gain method may consist of two types including one or both of a function based non-uniform spatial gain method, and a direct mapping spatial gain method.

In some other embodiments, when applying a uniform (linear) spatial gain method, a same thickness correction method be applied across a designated Training Region wherein a gain magnitude factor is equal at each pixel location. For example, all pixels within an optic zone may be modified by the arithmetic method using a 100% gain magnitude factor. In some additional embodiments, when applying a non-uniform spatial gain method, a same thickness correction method may be applied across a designated Training Region wherein a gain magnitude factor may be different at each pixel location. For example, pixels lying on a diameter of 4 mm may have a gain magnitude factor of 200% whereas pixels lying a diameter of 2 mm may have a gain magnitude factor of 150%.

Furthermore, in some related embodiments, when applying a function based non-uniform spatial gain method, a gain magnitude factor may be related to a radial location of a pixel. In some other related embodiments, when applying a direct mapping non-uniform spatial gain method, corresponding data may be leveraged from a Training Region of one or more previous DMD Shows, a measured Lens, and a Lens Design, to calculate a desired gain magnitude at each pixel location.

Figure 11:
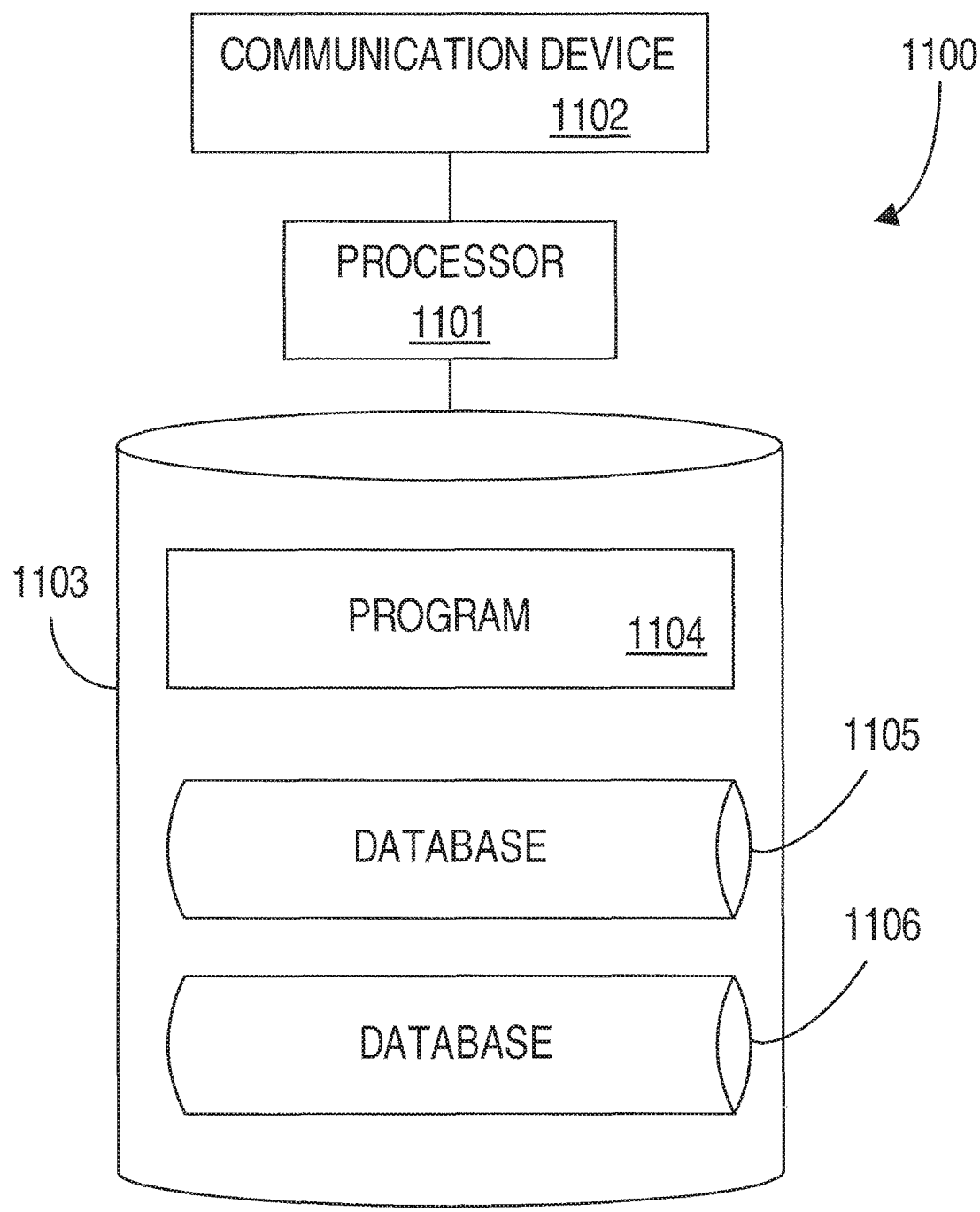
FIG. 11 illustrates a processor that may be used to implement some embodiments of the present invention.

Referring now to FIG. 11, illustrates a controller 1100 that may be used to implement some aspects of the present invention. A processor unit 1101, which may include one or more processors, coupled to a communication device 1102 configured to communicate via a communication network. The communication device 1102 may be used to communicate, for example, with one or more controller apparatus or manufacturing equipment components.

A processor 1101 may also be used in communication with a storage device 1103. A storage device 1103 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

A storage device 1103 may store an executable software program 1104 for controlling a processor 1101. A processor 1101 performs instructions of a software program 1104, and thereby operates in accordance with the present invention such as, for example, the aforementioned method steps. For example, a processor 1101 may receive information descriptive of a desired Lens Design. A storage device 1103 may also store ophthalmic related data in one or more databases 1105 and 1106. A database may include one or more of files containing DMD Show instruction data, customized Lens Design data, metrology data, defined Lens parameter data for specific Lens Designs.

CONCLUSION

The present invention, as described above and as further defined by the claims below, provides an apparatus for implementing a Convergence Process.

CALCULATIONS

Arithmetic Method:

$$\Delta^{th} \text{ value} = (\text{Target Thickness} - \text{Measured Lens Thickness})$$

$$\text{Scaled } \Delta^{th} \text{ value} = \frac{(\Delta th \text{ value} \times \text{Gain Factor})}{100}$$

Subsequent DMD Show Instruction =

$$\text{Previous Instruction} + \text{Scaled } \Delta th \text{ value}$$

Percentage Method:

Subsequent DMD Show Instruction =

$$\left( \frac{((\text{Previous Instruction} \times \text{Gain Factor}) \times (\text{Target Thickness} - \text{Measured Lens Thickness}))}{(\text{Measured Lens Thickness} \times 100)} \right)$$

What is claimed is:

1. A method for forming an ophthalmic Lens comprising:
positioning a substrate having an optical quality surface within a first volume of Fluent Lens Reactive Media,
obtaining a Contour Forming device including a DMD having an array of selectively controllable micro-mirrors;
creating a first DMD Show based upon a target Lens Design, said first DMD Show including a time-based sequence for selectively controlling said array of micro-mirrors of said DMD;
using the first DMD Show to control the DMD to selectively transmit actinic radiation through the substrate to thereby polymerize portions of the first volume of Fluent Lens Reactive Media on a voxel by voxel basis to from a first Lens Precursor;
further processing the first Lens Precursor to form a first ophthalmic Lens;
comparing the first ophthalmic Lens to the target Lens Design;
creating a second DMD Show by modifying the first DMD Show using a Convergence process based on information obtained from said comparing step;
positioning said substrate within a second volume of Fluent Lens Reactive Media;
using the second DMD Show to control the DMD to selectively transmit actinic radiation through the substrate to thereby polymerize portions of the second volume of Fluent Lens Reactive Media on a voxel by voxel basis to form a second Lens Precursor,
further processing the second Lens Precursor to form a second ophthalmic Lens;
wherein the second ophthalmic Lens more closely approximates the target Lens Design than said first ophthalmic Lens.

2. The method according to claim 1, wherein said Convergence process is a convergence masking technique.

3. The method according to claim 2, wherein said convergence masking technique masks a selected region of said first DMD Show, and wherein the selected region comprises one or more of a radius, a sector, a segment, and an area.

4. The method according to claim 3, wherein said convergence masking technique comprises a Blend Zone.

5. The method according to claim 4, wherein said Blend Zone comprises one or more specified zones connecting said selected masking region to one or more of a non-masked region.

6. The method according to claim 1, wherein said Convergence process comprises a one-sided modality.

7. The method according to claim 6, wherein said one-sided modality comprises adjusting one or more instructions of said first DMD Show by either decreasing a value of said instructions or increasing said value of said instructions.

8. The method according to claim 6, wherein said one-sided modality comprises a piston-shifting technique.

9. The method according to claim 8, wherein said piston-shifting technique comprises performing a uniform shift of an equal amount, of a selected portion of said first DMD Show instruction.

10. The method according to claim 6, wherein said one-sided modality comprises an apex-locking technique.

11. The method according to claim 10, wherein said apex-locking technique comprises a locked $I_{CT}$ wherein said $I_{CT}$ is set to a specified value, that remains constant during said modification of said first DMD Show.

12. The method according to claim 6, wherein said Convergence technique comprises a two-sided modality.

13. The method according to claim 12, wherein said two-sided modality comprises adjusting parameters of instructions of said first DMD Show by decreasing values of a first portion of said instructions, and increasing values of a second portion of said instructions.

14. The method according to claim 13, wherein said two-sided modality comprises a piston-shifting technique.

15. The method according to claim 13, wherein said two-sided modality comprises an apex-locking technique; wherein said apex-locking technique comprises a locked ICT wherein said ICT is set to a specified value, that remains constant during said modification.

* * * * *